US012639890B2

(12) United States Patent
Luan et al.

(10) Patent No.: US 12,639,890 B2
(45) Date of Patent: May 26, 2026

(54) SAMPLING LIGHT DIRECTIONS ON NEURAL MATERIALS

(71) Applicants:Adobe Inc., San Jose, CA (US); THE REGENTS OF THE UNIVERSITY OF CALIFORNIA, Oakland, CA (US)

(72) Inventors: Fujun Luan, Sunnyvale, CA (US); Zexiang Xu, San Jose, CA (US); Miloš Hašan, Lafayette, CA (US); Iliyan Atanasov Georgiev, London (GB); Liwen Wu, La Jolla, CA (US); Bing Xu, San Diego, CA (US); Ravi Ramamoorthi, Carlsbad, CA (US)

(73) Assignees: Adobe Inc., San Jose, CA (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 218 days.

(21) Appl. No.: 18/644,322

(22) Filed: Apr. 24, 2024

(65) Prior Publication Data

US 2025/0336145 A1     Oct. 30, 2025

(51) Int. Cl.
*G06T 15/50* (2011.01)

(52) U.S. Cl.
CPC .................................. *G06T 15/506* (2013.01)

(58) Field of Classification Search
CPC ..................................................... G06T 15/506
See application file for complete search history.

(56) References Cited

U.S. PATENT DOCUMENTS

2023/0360311 A1* 11/2023 Ouyang ................ G06T 15/506
2024/0046622 A1*  2/2024 Tsutsumi ........... G06V 10/7792

OTHER PUBLICATIONS

Baatz, H., et al., "NeRF-Tex: Neural Reflectance Field Textures", Wiley Online Library, Computer Graphics Forum, vol. 41, No. 6, Mar. 17, 2022.
Dinh, Laurent, et al., "Density estimation using Real NVP", Cornell University, arXiv Preprint, arxiv.org, May 27, 2016, 32 pages.
Dinh, Laurent, et al., "NICE: Non-linear Independent Components Estimation", Cornell University, arXiv Preprint, arxiv.org, Oct. 30, 2014, 13 pages.
Dolatabadi, et al., "Invertible Generative Modeling using Linear Rational Splines", Proceedings of the 23rd International Conference on Artificial Intelligence and Statistics (AISTATS) 2020, Palermo, Italy. PMLR: vol. 108, 2020, 11 pages.
Durkan, et al., "Neural spline flows", Advances in neural information processing systems 32, 2019, 19 pages.
(Continued)

*Primary Examiner* — Matthew Salvucci
(74) *Attorney, Agent, or Firm* — FIG. 1 Patents

(57) ABSTRACT

In implementation of techniques for sampling light directions on neural materials, a computing device implements a light direction system to receive neural features of a material and an indication of a view direction toward the material. Using a mixture of analytical lobes, a normalizing flow, or a histogram prediction, the light direction system predicts a probability density function (PDF). The light direction system then samples the PDF, calculates prominence values for each of a plurality of candidate light directions based on the PDF, and determines a light direction based on the prominence values.

20 Claims, 10 Drawing Sheets

(56) References Cited

OTHER PUBLICATIONS

Fan, et al., "Neural Layered BRDFs", In ACM SIGGRAPH 2022 Conference Proceedings (SIGGRAPH '22). Association for Computing Machinery, New York, NY, USA, Article 4, 2022, 11 pages.

Huang, et al., "Neural Autoregressive Flows", In International Conference on Machine Learning, 2018, pp. 2078-2087.

Jakob, et al., "Dr. Jit: A Just-In-Time Compiler for Differentiable Rendering", Transactions on Graphics (Proceedings of SIG-GRAPH) 41, 4, Jul. 2022, 19 pages.

Kobyzev, et al., "Normalizing Flows: An Introduction and Review of Current Methods", Cornell University, arXiv.org pre-print, arXiv:1908.09257v4 [stat.ML], retrieved from the internet on Jul. 20, 2024, <https://arxiv.org/pdf/1908.09257>, Jun. 6, 2020, 17 pages.

Kuznetsov, Alexandr, et al., "NeuMIP: Multi-Resolution Neural Materials", Cornell University arXiv, arXiv.org [retrieved Mar. 19, 2023]. Retrieved from the Internet <https://arxiv.org/pdf/2104.02789. pdf>., Apr. 6, 2021, 12 Pages.

Kuznetsov, Alexandr, et al., "Rendering Neural Materials on Curved Surfaces", SIGGRAPH '22 Conference Proceedings [retrieved Mar. 19, 2023]. Retrieved from the Internet <https://dl.acm.org/doi/pdf/ 10.1145/3528233.3530721>., Aug. 7, 2022, 9 Pages.

Muller, et al., "Neural Importance Sampling", ACM Transactions on Graphics, vol. 38, Issue 5, Article 145, Oct. 10, 2019, 19 pages.

Ngan, et al., "Experimental Analysis of BRDF Models", EGSR '05: Proceedings of the Sixteenth Eurographics conference on Rendering Techniques, Jun. 29, 2005, 13 pages.

Papamakarios, et al., "Masked Autoregressive Flow for Density Estimation", 31st Conference on Neural Information Processing Systems (NIPS 2017), 2017, 10 pages.

Papamakarios, et al., "Normalizing Flows for Probabilistic Modeling and Inference", Journal of Machine Learning Research 22, 2021, 64 pages.

Paszke, Adam, et al., "PyTorch: An Imperative Style, High-Performance Deep Learning Library", Cornell University arXiv, arXiv.org [retrieved Aug. 9, 2023]. Retrieved from the Internet <https://arxiv.org/pdf/1912.01703.pdf>., Dec. 3, 2019, 12 Pages.

Rainer, Gilles, et al., "Neural BTF Compression and Interpolation", Computer Graphics Forum, vol. 38, No. 2 [retrieved Mar. 19, 2023]. Retrieved from the Internet <https://reality.tf.fau.de/projects/btf/ rainer19neural-lowres.pdf>., Jun. 7, 2019, 10 Pages.

Rainer, Gilles, et al., "Unified Neural Encoding of BTFs", Computer Graphics Forum, vol. 39, No. 2 [retrieved Mar. 22, 2023]. Retrieved from the Internet <https://spiral.imperial.ac.uk/bitstream/10044/1/ 79317/2/unifiedBTF-lowres.pdf>., May 2020, 12 Pages.

Sztrahman, et al., "Neural BRDF Representation and Importance Sampling", Computer Graphics Forum, vol. 40, No. 6, 2021, pp. 332-346.

Veach, Eric, "Robust Monte Carlo Methods for Light Transport Simulation", Dec. 1997, 432 pages.

Walter, Bruce, et al., "Microfacet Models for Refraction through Rough Surfaces", Proceedings of the 18th Eurographics Conference on Rendering Techniques, EGSR'07, Goslar, DEU, Eurographics Association [retrieved on Mar. 28, 2023]. Retrieved from the Internet <shorturl.at/hDEJ1>., Jun. 2007, 12 pages.

Wehenkel, et al., "Unconstrained Monotonic Neural Networks", 33rd Conference on Advances in Neural information Processing Systems (NeurIPS 2019), Vancouver, Canada, 2019, 11 pages.

Winkler, et al., "Learning Likelihoods With Conditional Normalizing Flows", Cornell University arXiv, arXiv.org [retrieved Jul. 20, 2024]. Retrieved from the Internet <https://arxiv.org/pdf/1912. 00042>., 2019, 18 pages.

Xie, et al., "Multiple Scattering using Machine Learning", In ACM SIGGRAPH 2019 Talks (SIGGRAPH '19). Association for Computing Machinery, Article 70, 2019, 2 pages.

Zhu, Junqiu, "Neural complex luminaires: representation and rendering", ACM Transactions on Graphics, vol. 40, No. 4 [retrieved Mar. 19, 2023]. Retrieved from the Internet <https://sites.cs.ucsb. edu/~lingqi/publications/paper_complum.pdf>., Jul. 19, 2021, 12 Pages.

* cited by examiner

200

700

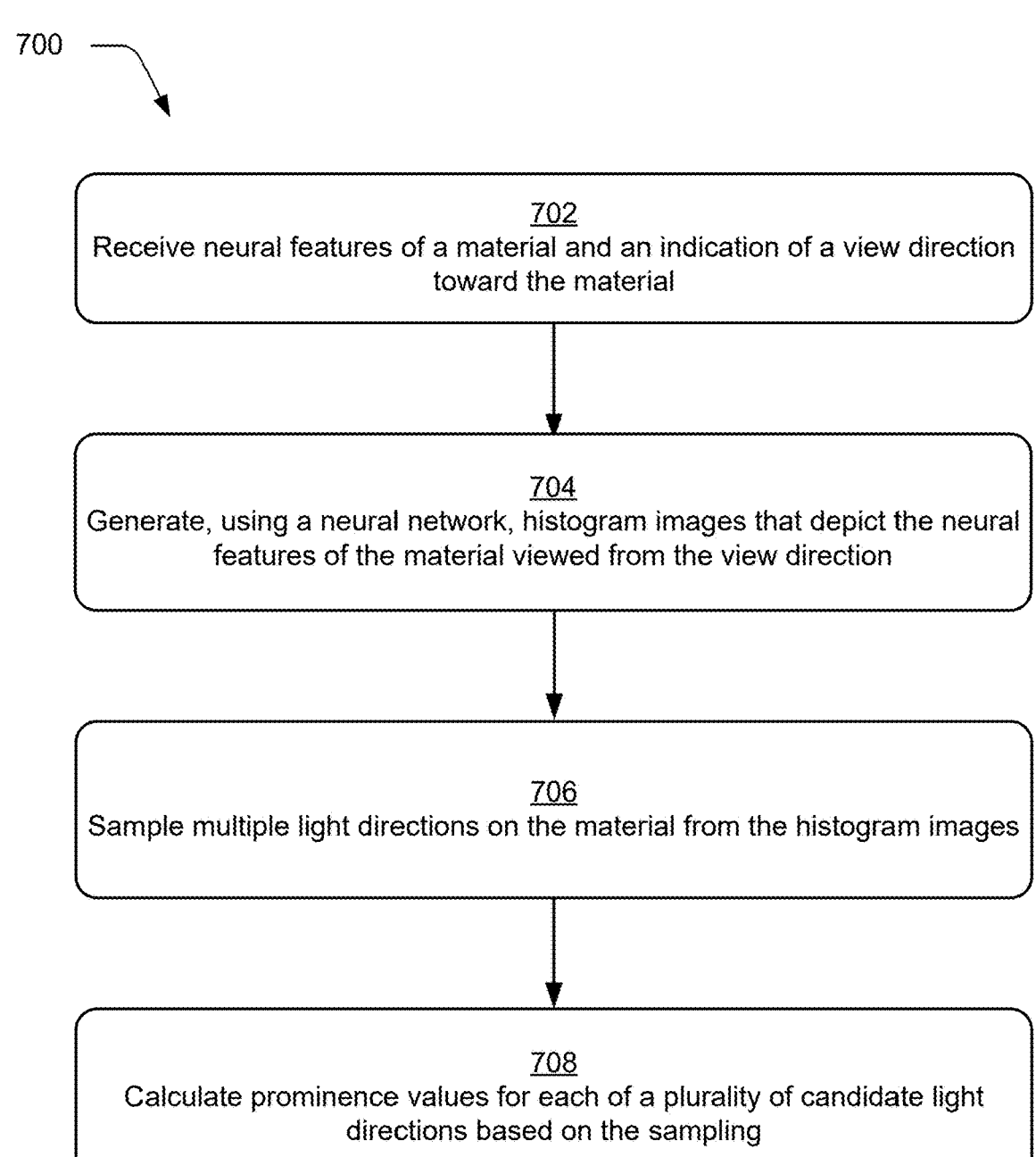

702
Receive neural features of a material and an indication of a view direction toward the material 704
Generate, using a neural network, histogram images that depict the neural features of the material viewed from the view direction 706
Sample multiple light directions on the material from the histogram images 708
Calculate prominence values for each of a plurality of candidate light directions based on the sampling 710
Determine a light direction based on the prominence values and edit digital content using the light direction

Fig. 7

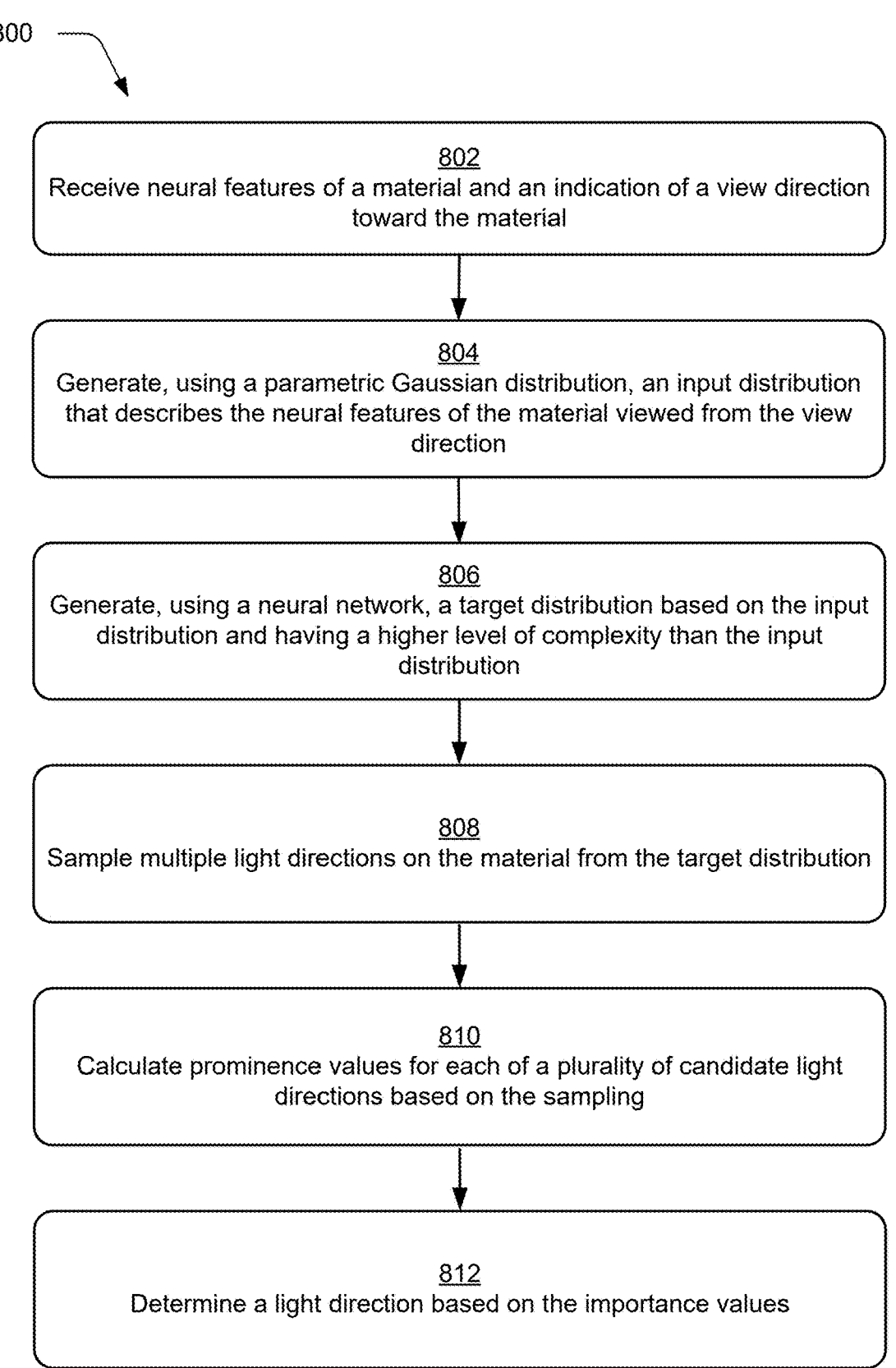

800

802
Receive neural features of a material and an indication of a view direction toward the material 804
Generate, using a parametric Gaussian distribution, an input distribution that describes the neural features of the material viewed from the view direction 806
Generate, using a neural network, a target distribution based on the input distribution and having a higher level of complexity than the input distribution 808
Sample multiple light directions on the material from the target distribution 810
Calculate prominence values for each of a plurality of candidate light directions based on the sampling 812
Determine a light direction based on the importance values

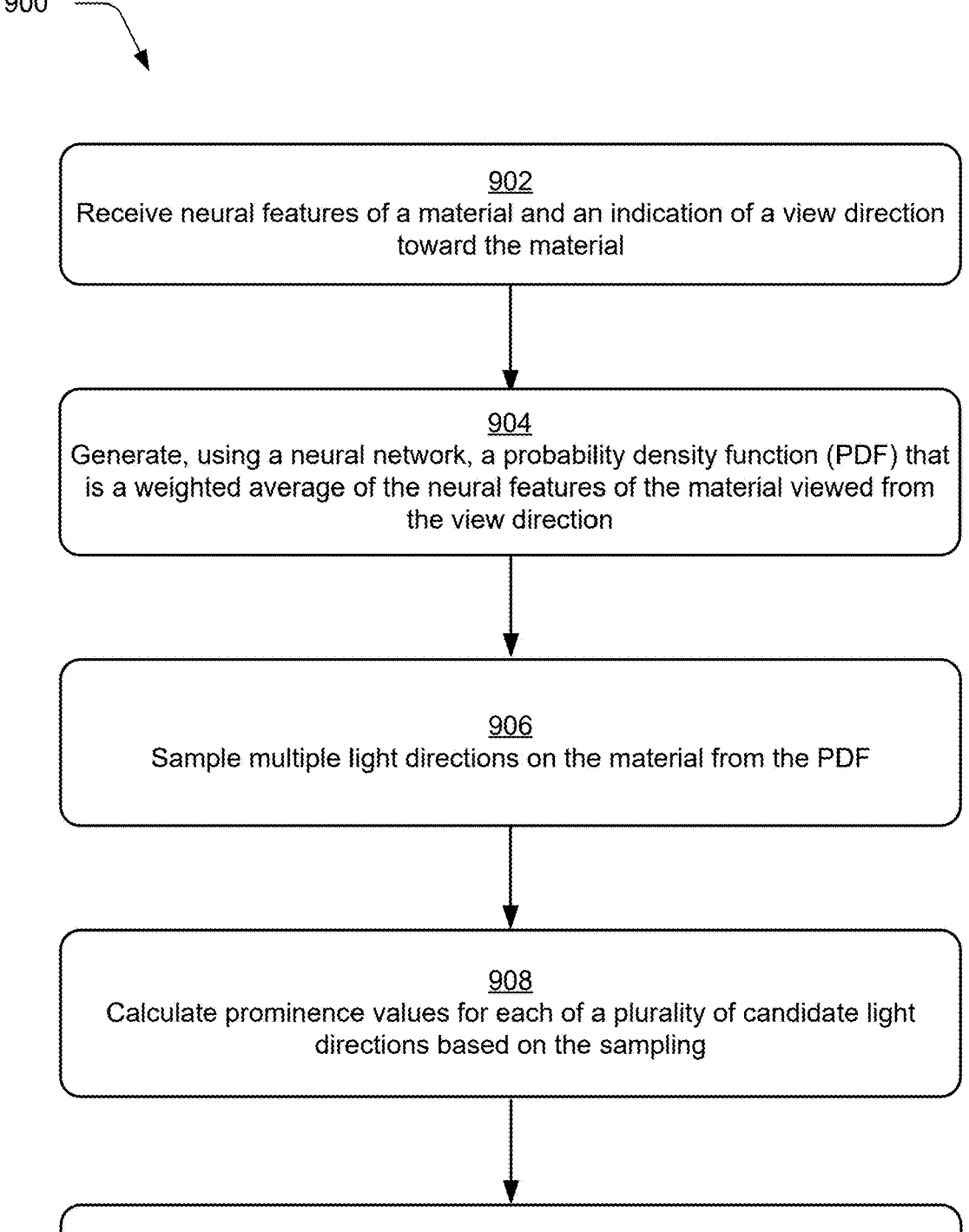

902
Receive neural features of a material and an indication of a view direction toward the material

904
Generate, using a neural network, a probability density function (PDF) that is a weighted average of the neural features of the material viewed from the view direction

906
Sample multiple light directions on the material from the PDF

908
Calculate prominence values for each of a plurality of candidate light directions based on the sampling

910
Determine a light direction based on the prominence values

Fig. 9

1000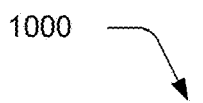
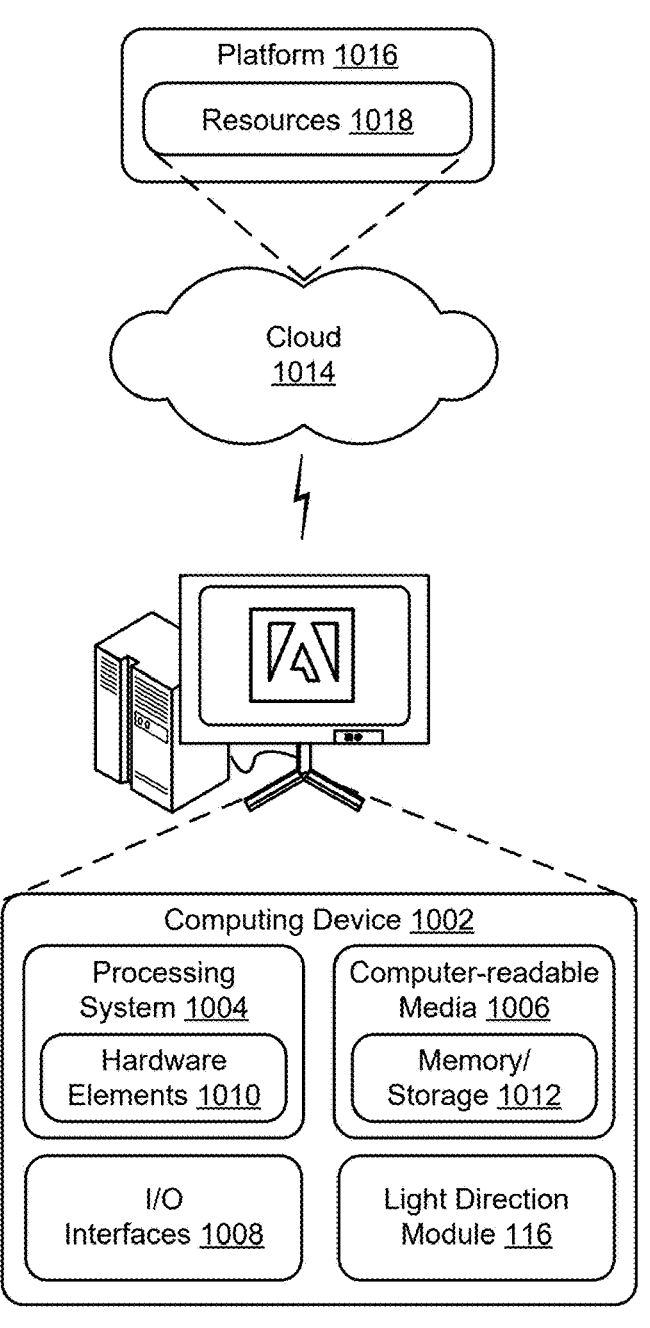
Platform 1016
Resources 1018
Cloud 1014
Computing Device 1002
Processing System 1004
Hardware Elements 1010
Computer-readable Media 1006
Memory/ Storage 1012
I/O Interfaces 1008
Light Direction Module 116
Fig. 10

SAMPLING LIGHT DIRECTIONS ON NEURAL MATERIALS

BACKGROUND

In computer graphics, a neural material uses a set of feature textures to virtually represent a material. The neural material encodes various appearance effects, including reflectance, displacement, anisotropy, and multi-layered bidirectional reflectance distribution used to model visual details for virtual three-dimensional (3D) objects. For example, the neural material is applied to a surface of a virtual 3D object to simulate an appearance of different physical materials, including wood, metal, fabric, or stone. Neural materials are created using image editing applications to model spatially-varying properties of the material in a virtual environment for application to the surface of the virtual 3D object within a 3D rendering or game engine. However, conventional techniques used to sample neural materials often result in computational inefficiencies in real world scenarios.

SUMMARY

Techniques and systems for sampling light directions on neural materials are described. In an example, a light direction system receives neural features of a material and an indication of a view direction toward the material. For example, the view direction aligns with an orientation of a camera.

The light direction system uses a neural network to generate histogram images that depict the neural features of the material viewed from the view direction. The histogram images encode distributions of brightness of the material based on the view direction. The light direction system samples multiple light directions on the material from the histogram images and calculates prominence values for each of a plurality of candidate light directions based on the sampling. The prominence values quantize a contribution of light to the neural features of the material when viewed from the view direction. Based on the prominence values, the light direction system determines a light direction.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRA WINGS

The detailed description is described with reference to the accompanying figures. Entities represented in the figures are indicative of one or more entities and thus reference is made interchangeably to single or plural forms of the entities in the discussion.

FIG. 7 depicts a procedure in an example implementation of sampling light directions on neural materials.

FIG. 8 depicts a procedure in an additional example implementation of sampling light directions on neural materials.

FIG. 9 depicts a procedure in an additional example implementation of sampling light directions on neural materials.

FIG. 10 illustrates an example system including various components of an example device that can be implemented as any type of computing device as described and/or utilized with reference to FIGS. 1-9 to implement embodiments of the techniques described herein.

DETAILED DESCRIPTION

Overview

Figure 1:
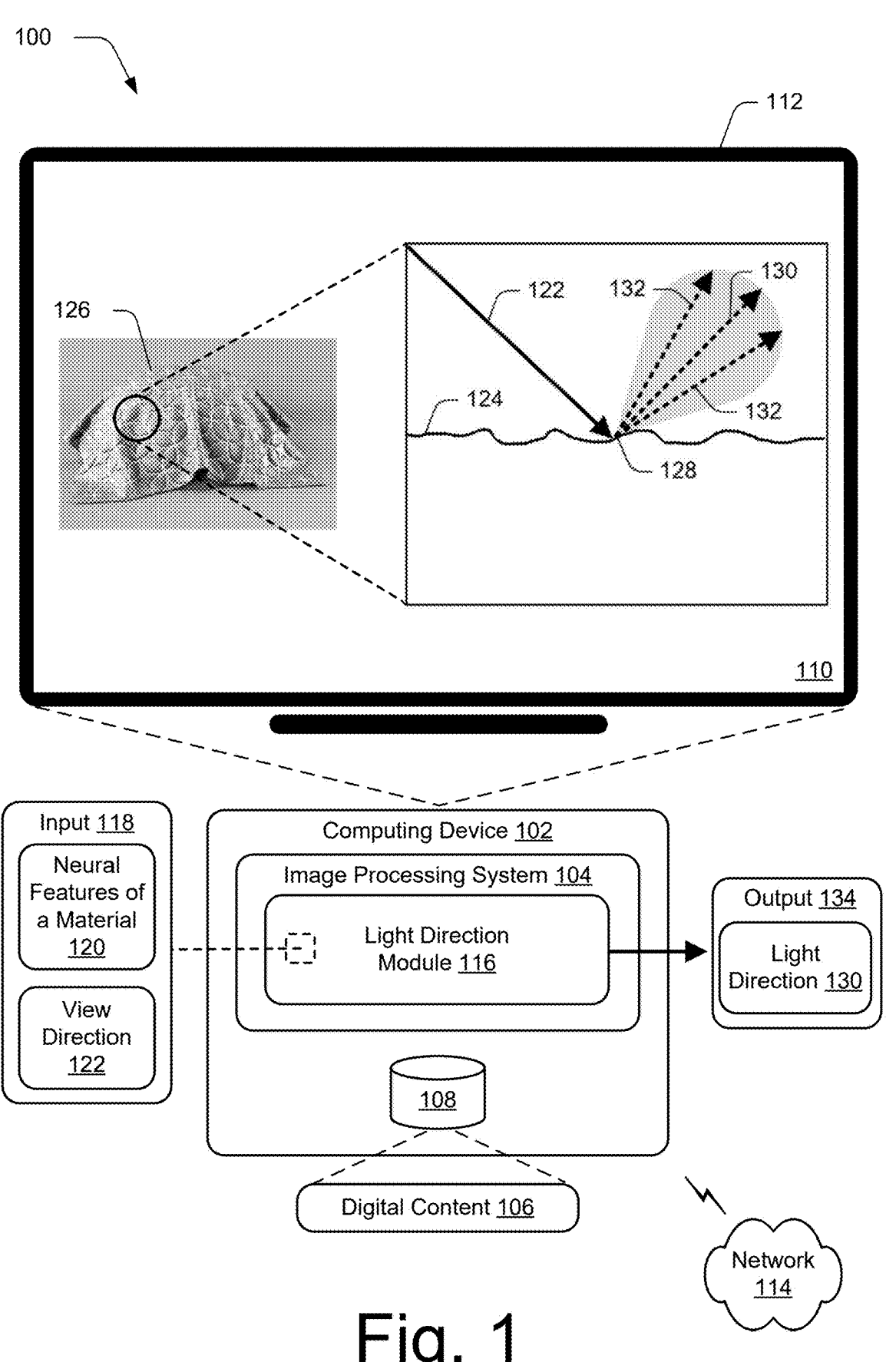
FIG. 1 is an illustration of a digital medium environment in an example implementation that is operable to employ techniques and systems for sampling light directions on neural materials as described herein.

Material models are used for rendering photo-realistic images of three-dimensional (3D) scenes in a virtual environment. Neural materials are a type of material model that uses a set of feature textures to virtually represent a material at different levels. By encoding various appearance effects, including gloss and reflectance, a neural material models visual details for virtual 3D objects. To realistically represent materials, the neural materials combine learned spatial-feature textures and fully connected blocks to approximate reflectance on a surface of the virtual 3D object based on position, incoming light directions, and outgoing light directions.

To apply a neural material to a curved silhouette of a 3D virtual object, sampling is performed on the neural material. The purpose of the sampling is to identify directions of light that are "prominent," or have a significant contribution to a visual effect of a neural material from a specific viewpoint to render realistic lighting effects, including reflections and glare, on materials in a virtual environment. For instance, surfaces with low reflectivity, such as a brick wall, have an even distribution of high-prominence light directions because a location of a light source relative to the brick wall does not greatly alter visual qualities of the material. Surfaces with high reflectivity, such as glass or a mirror, have a single prominent light direction because a glare is visible from one light direction at a given viewpoint.

Conventional sampling techniques rely on random light direction sampling, which is time-consuming and resource-heavy because light directions are sampled without guidance as to which light directions are likely to have high levels of prominence. Some existing models are capable of determining a prominence of a given light direction. However, the existing models are not capable of identifying a light direction that has a high level of prominence, given a view direction.

Techniques and systems are described for sampling light directions on neural materials that overcome these limitations. A light direction system begins in this example by receiving neural features of a material. The neural features include encoded information describing visual characteristics of a surface of the material, including how light from different angles interacts with the surface of the material. For example, the encoded information of the neural features describes gloss, highlights, and shadows that are visible from various viewpoints on the material, depending on a light direction from a given light source. The light direction system also receives an indication of a view direction, which indicates a specific viewpoint onto the material from which the light directions are evaluated.

After receiving the neural features and the indication of the view direction toward the material, the light direction system uses a neural network to translate the neural features into a probability density function (PDF), which is medium that is more efficient for the light direction system to sample than randomly sampling light directions directly from the information of the neural features. To translate the neural features, the neural network employs a mixture of analytical lobes, a normalizing flow, or a histogram prediction.

Using the mixture of analytical lobes, for example, the neural network generates the PDF, which is a weighted average of a number of estimated analytical distribution probability components that describe the neural features of the material viewed from the view direction. Using the normalizing flow, the neural network generates an input distribution that describes the neural features of the material viewed from the view direction using a parametric Gaussian distribution and then generates a target distribution based on the input distribution having a higher level of complexity than the input distribution to predict the PDF. Using the histogram prediction, by contrast, the neural network generates multiple histogram images that depict the neural features of the material from the view direction and are weighted to encode distributions of brightness of the neural material based on the view direction to predict the PDF.

The light direction system then samples multiple light directions on the neural material, by sampling light directions from the PDF. Based on the sampling, the light direction system calculates prominence values for each of the sampled light directions, which indicate a level of contribution of a specific light direction to the visual effect of a neural material. The light direction system identifies the one or more light directions with the highest values as prominent light directions. The prominent light directions are then used to apply the neural material to the curved silhouette of the 3D virtual object or are saved with the neural features of the material for future application.

Sampling light directions on neural materials in this manner overcomes the disadvantages of conventional sampling techniques that are limited to random direction sampling. For example, generating the PDF using the analytical lobes, the normalizing flow, or the multiple histogram images allows the light direction system to intelligently sample light directions without random sampling. For these reasons, sampling light directions on neural materials in this manner is faster and conserves more computing resources than conventional sampling techniques.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for sampling light directions on neural materials described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 10.

The computing device 102 also includes an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 for display in a user interface 110 for output, e.g., by a display device 112. Although illustrated as implemented locally at the computing device 102, functionality of the image processing system 104 is also configurable entirely or partially via functionality available via the network 114, such as part of a web service or "in the cloud."

The computing device 102 also includes a light direction module 116 which is illustrated as incorporated by the image processing system 104 to process the digital content 106. In some examples, the light direction module 116 is separate from the image processing system 104 such as in an example in which the light direction module 116 is available via the network 114.

The light direction module 116 is configured to identify light directions on a surface of a neural material that have higher levels of prominence than other light directions. As illustrated, the light direction module 116 first receives an input 118 including neural features of a material 120 and a view direction 122. The neural features of the material 120 include encoded information that describes interaction of light with a surface 124 of a neural material 126. For example, the neural features of the material 120 relate to a specific labeled virtual substance, such as "Crocodile Leather," "Antique Brass," "Porcelain," or other material for application to a 3D virtual environment. The encoded information of the neural features of the material 120 is therefore capable of rendering its respective material when processed.

The view direction 122 indicates a camera angle from which the surface 124 of the neural material 126 is viewed for a first-bounce intersection of light on the surface 124 of the material 120. The view direction 122 is relevant to sampling light directions on neural materials because effects of light, including glare, reflections, and shadows, appear differently based on what direction the surface 124 of the neural material 126 is viewed. For example, the view direction 122 indicates a point 128 on the surface 124 of the neural material 126 and an angle at which the point 128 is viewed. Although the input 118 is described with respect to the first-bounce intersection of light on the surface 124 of the material 120, other examples contemplate inputs describing interactions other than first-bounce intersections.

After receiving the neural features of the material 120 and the view direction 122, the light direction module 116 samples multiple light directions on the neural material 126, for example, using prominence sampling, also referred to as "importance sampling." To determine which light directions to sample, the light direction module 116 uses a mixture of analytical lobes, a normalizing flow, or a histogram prediction leveraged by a neural network.

Using the mixture of analytical lobes, for example, the light direction module 116 generates a probability density function (PDF) using the neural network. The PDF is a weighted average of the neural features of the material 120 viewed from the view direction 122 and describes a likelihood of a continuous random variable taking on a specific value within a given range. The probability density function is described in further detail with respect to FIG. 4.

Alternatively, using the normalizing flow, the light direction module 116 generates an input distribution that describes the neural features of the material 120 viewed from the view direction 122 using a parametric Gaussian distribution. Then, the light direction module 116 generates a target distribution based on the input distribution that has a higher level of complexity than the input distribution to predict the PDF. The normalizing flow is described in further detail with respect to FIG. 5.

Using the histogram prediction, by contrast, the light direction module 116 uses a neural network to generate multiple histogram images that depict the neural features of the material 120 from the view direction 122. The multiple histogram images are weighted and encode distributions of brightness of the neural material 126 based on the view direction 122 to predict the PDF. The histogram prediction is described in further detail with respect to FIG. 6.

Based on results from the mixture of analytical lobes, the normalizing flow, or the histogram prediction, the light direction module 116 samples multiple light directions on the neural material 126. For example, the light direction module 116 samples light directions from the PDF.

The light direction module 116 then calculates and assigns prominence values to each of the multiple light directions based on the sampling. The calculated prominence values quantize a level of contribution of a given light direction to a visual appearance of a material, which are used to realistically render the material. A high prominence value indicates a high level of color or prominent light reflection for a particular light direction on the surface 124 compared to other light directions. For example, the light direction module 116 identifies a light direction 130 having a higher prominence value than other light directions 132 on the neural material 126. The light direction module 116 then generates an output 134 including the light direction 130, further examples of which are described in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Sampling Light Directions on Neural Materials

Figure 2:
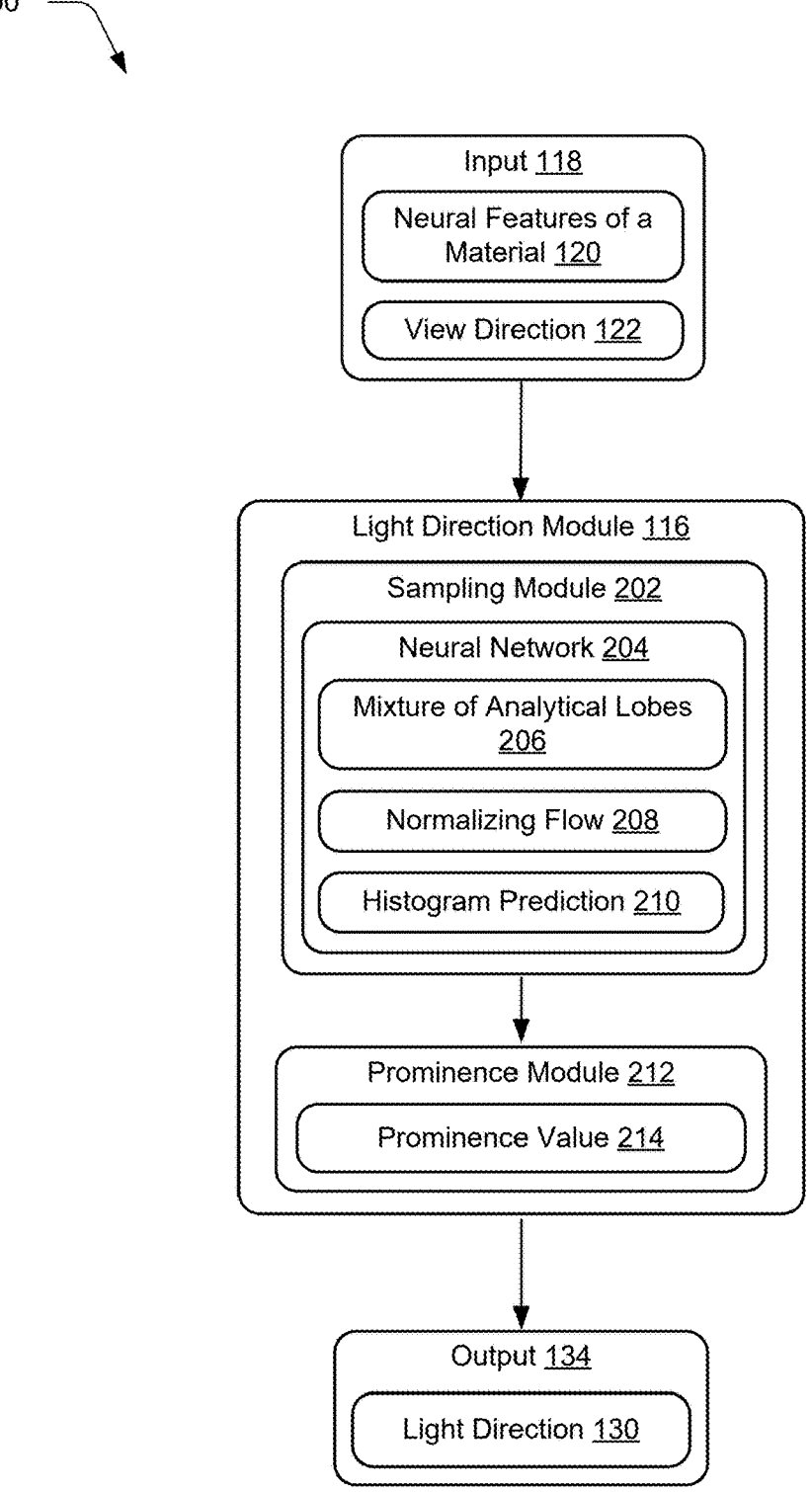
FIG. 2 depicts a system in an example implementation showing operation of a light direction module for sampling light directions on neural materials.

FIG. 2 depicts a system 200 in an example implementation showing operation of the light direction module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-10.

To begin in this example, a light direction module 116 receives an input 118 including neural features of a material 120 and a view direction 122. The input 118 is selected by a user from a list of materials or is automatically selected by the light direction module 116 to render a material in a virtual 3D environment. The neural features of the material 120 describe a particular neural material and describe visual properties of the particular neural material, including how light from different directions impacts visual qualities of the surface of the particular neural material. The view direction 122 specifies a direction or viewpoint by which the surface of the particular neural material is viewed. For example, the view direction 122 is a camera angle or an intended view direction of a user.

The light direction module 116 includes a sampling module 202. The sampling module 202 leverages a neural network 204 or other machine learning model to translate the neural features of the material 120 into a probability density function (PDF) for sampling, using one of multiple different models. For example, the sampling module 202 generates the PDF using a mixture of analytical lobes 206, a normalizing flow 208, or a histogram prediction 210. The sampling module 202 then samples light directions from the PDF, which narrows sampling options for the sampling module 202 and reduce random sampling.

The light direction module 116 also includes a prominence module 212. The prominence module 212 determines a prominence value 214 for each of the multiple light directions based on the sampling performed by the sampling module 202. The prominence value 214 indicates a level of contribution of light to the neural features of the material 120 when viewed from the view direction 122. A light direction forming a bright glare on a surface of the neural material 126, for instance, is assigned a higher prominence level than a light direction forming a dull glow on the surface. Based on the prominence value 214, the light direction module 116 identifies a light direction 130 that has a prominence value 214 that is higher than other prominence values determined for other lights directions.

The light direction module 116 then generates an output 134 indicating the light direction 130. The light direction 130 is then applied to edit, generate, or render digital content in a virtual environment. In some examples, the light direction 130 is stored in storage for later application for editing digital content.

FIGS. 3-10 depict stages of sampling light directions on neural materials. In some examples, the stages depicted in these figures are performed in a different order than described below.

Figure 3:
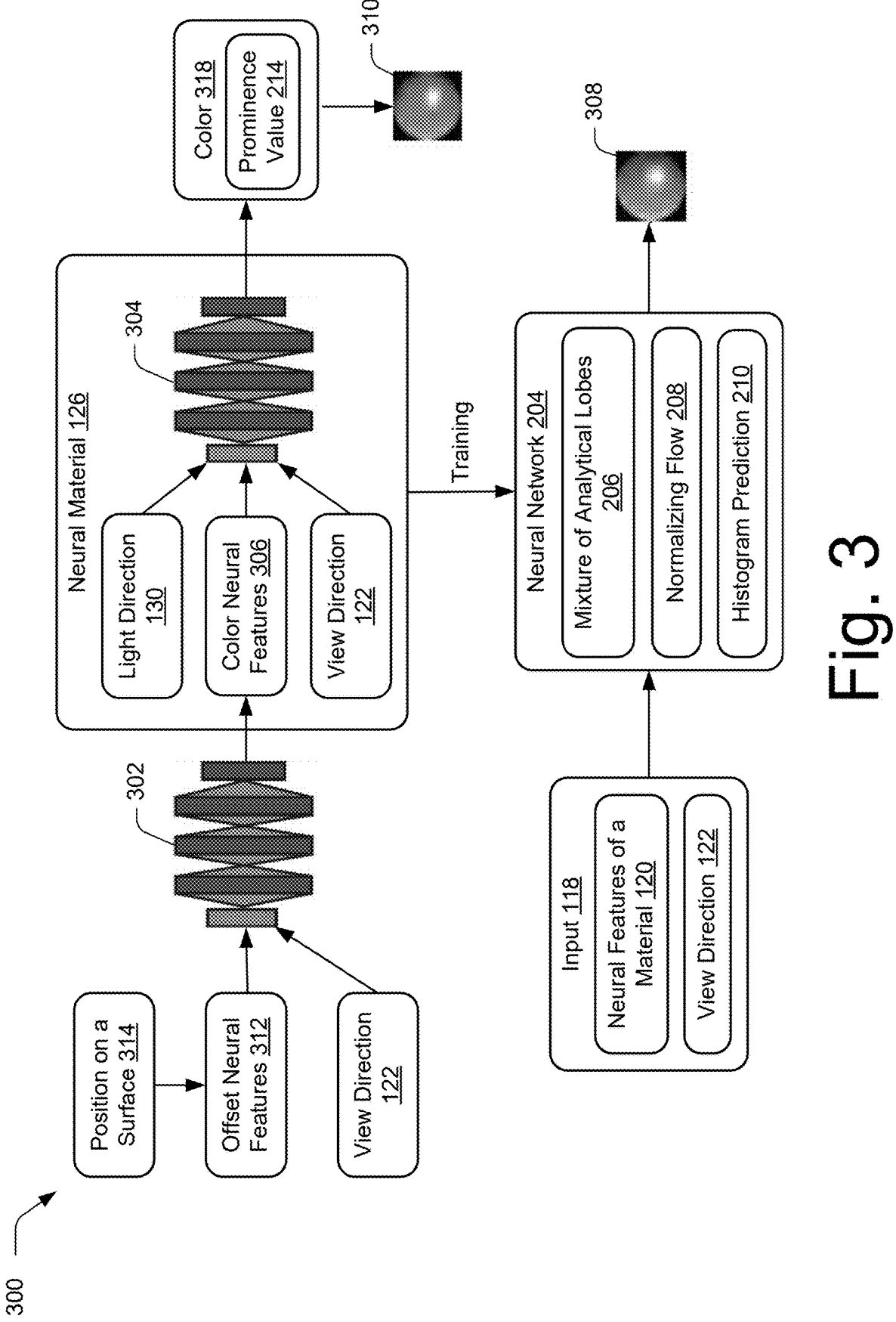
FIG. 3 depicts an example of a neural material used for sampling light directions on neural materials.

FIG. 3 depicts an example 300 of a neural material used for sampling light directions on neural materials. Neural materials, or multi-resolution neural materials (NeuMIP) use a set of feature textures to represent a material at different levels, combined with a fixed per-material fully connected neural network. As illustrated, a neural material 126 encodes various appearance effects, including specular/glossy reflectance, displacement, anisotropy, and multi-layered bidirectional reflectance distribution functions (BRDFs). Reflectance refers to a ratio of intensity of light reflected from a surface to the intensity of light incident upon it. Anisotropy refers to a property of a material that exhibits different behaviors or properties when measured along different axes. BRDFs describe a relationship between incoming light direction, outgoing light direction, and surface properties of a material.

The NeuMIP architecture uses two feature textures and two multilayer perceptrons (MLPs), here a first MLP 302 and a second MLP 304. The second MLP 304 depends on a light direction 130 and therefore involves prominence sampling (e.g., importance sampling), whereas the first MLP 302 does not involve prominence sampling in this example. The second MLP 304 is trained on synthetically rendered slices of a 6D reflectance function with view direction 122 that varies, and light direction 130 that varies, based on color neural features 306 output from the first MLP 302. The light direction module 116 uses the neural network 204 to sample neural materials and generate predicted light directions 308, conditioned on the pretrained NeuMIP features, including reference light directions 310, using a mixture of analytical lobes 206, normalizing flow 208, or histogram prediction 210.

The light direction module 116 identifies an approximation $p(\omega|\varphi, \omega_i)$ to target pdf $p^*(\omega|\varphi, \omega_i)$ over outgoing directions $\omega$, conditioned on an incoming direction $\omega_i$ and a local feature vector $\varphi$ that encodes the material properties at a given location. The target pdf $p^*$ is the luminance of a bidirectional reflectance distribution function (BRDF) lobe at that location and direction, normalized to integrate to 1 over the hemisphere, which is a perfect sampling distribution.

The objective of the light direction module 116 is to proportionally sample the product of the BRDF and the cosine foreshortening on the unit hemisphere H. This is equivalent to sampling the projection of the BRDF (without cosine) onto the unit disk $H_\perp$. The pdf is transformed into a hemispherical pdf, for instance, via multiplication with the cosine term (division in the opposite direction). Fit distributions of unit-disk projections $\omega_\perp \in H_\perp$ are chosen, and the planar unit disk is a domain for defining the pdfs.

Sampling is learned for a variant of NeuMIP [Kuznetsov et al. 2021], where the BRDF depends on a learnt 8-dimensional feature vector $\varphi$ that is retrieved from a given UV coordinate. In NeuMIP, the UV coordinate is corrected using offset neural features 312 based on a position on a surface 314 to handle parallax effects and to generate color neutral features 316, as the offsetting happens before BRDF sampling.

Figure 4:
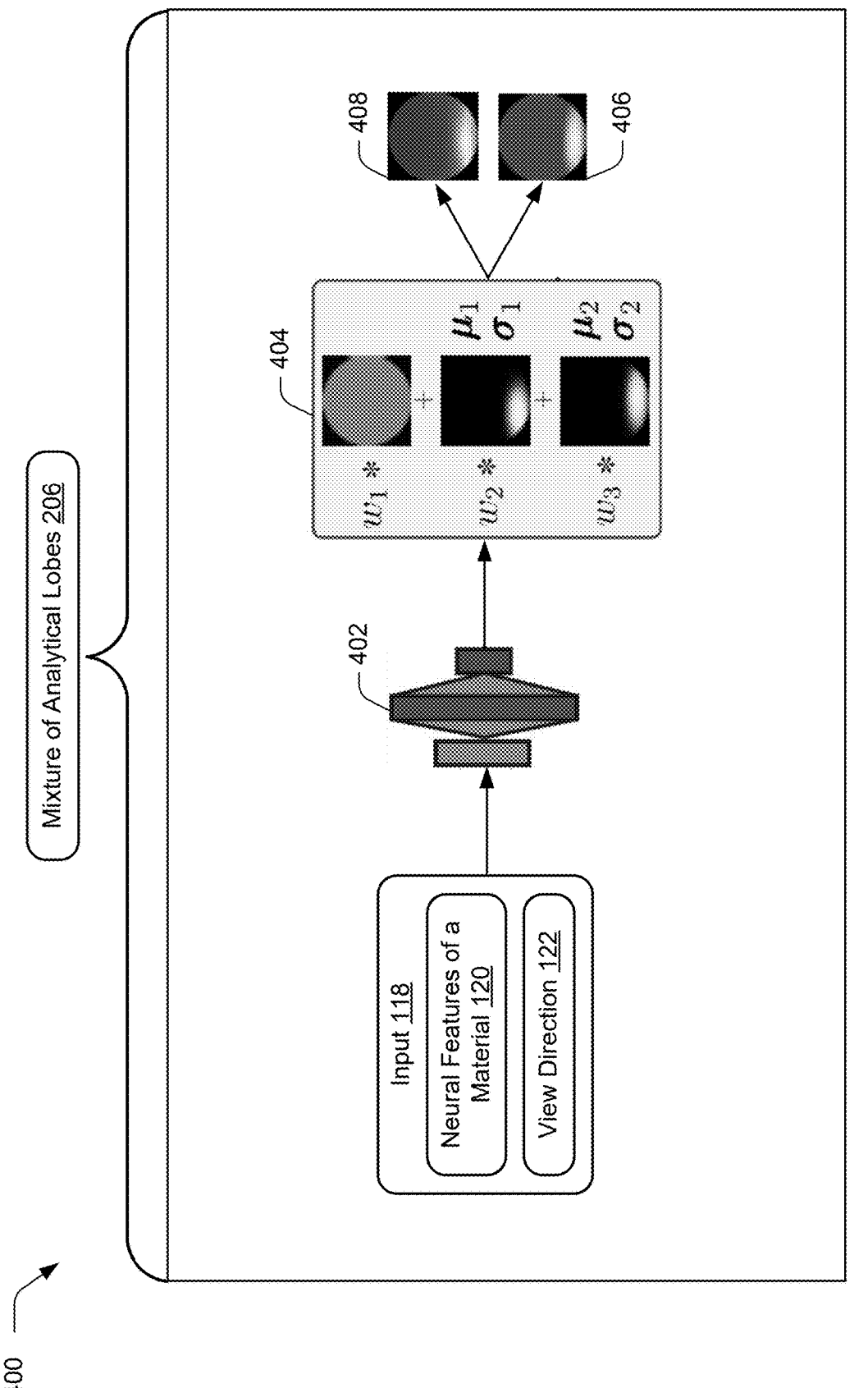
FIG. 4 depicts an example of using a mixture of analytical lobes for sampling light directions on neural materials.
Figure 5:
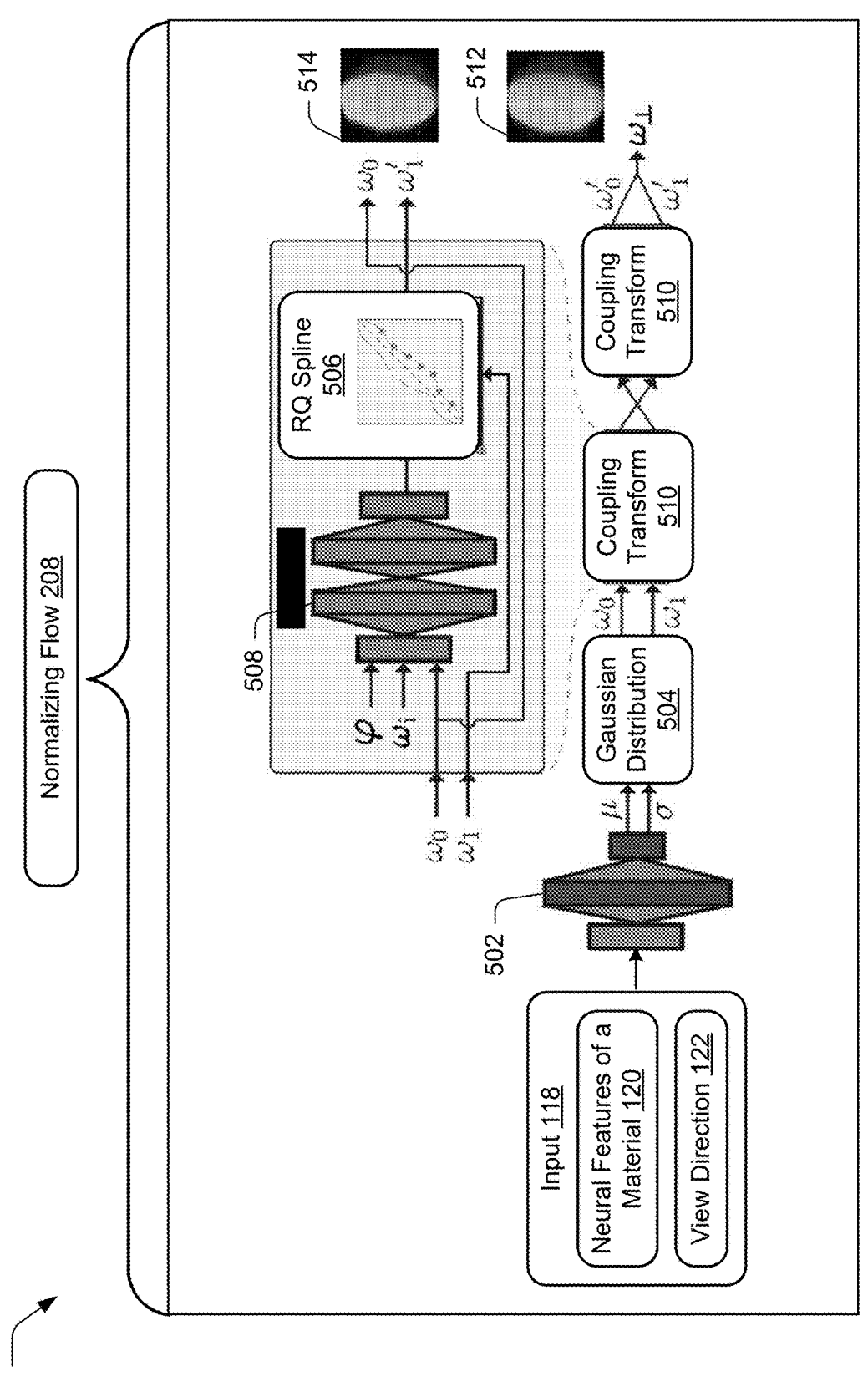
FIG. 5 depicts an example of using a normalizing flow for sampling light directions on neural materials.
Figure 6:
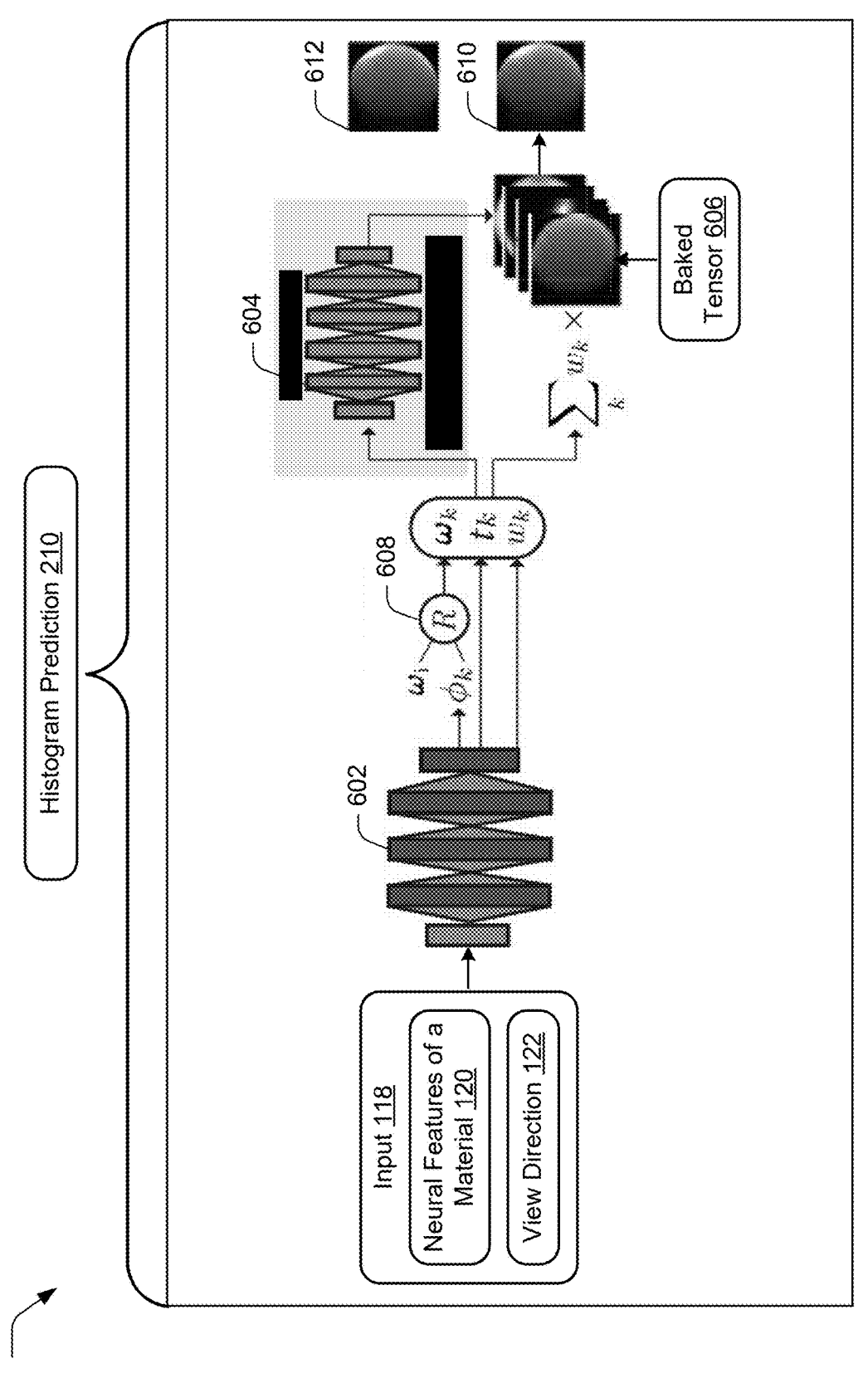
FIG. 6 depicts an example of using a histogram prediction for sampling light directions on neural materials.

In some examples, the light direction module 116 uses three neural sampling approaches, including a mixture of analytical lobes 206, a normalizing flow 208, or a histogram prediction 210, as discussed in detail with respect to FIGS. 4-6. The neural networks are trained to fit the pdf p to the ground truth p* by minimizing the KL divergence $D_{KL}$ (p*‖p) between the pdf p and the ground truth p*. This is equivalent to maximizing the log-likelihood (with respect to p) of directions sampled from the ground truth distribution p*. The ground truths are sampled from the ground-truth p*. The ground truths are sampled from the ground-truth distribution $p^*(\omega_\perp|\varphi, \omega_i)$ (discretized to a high-resolution grid of directions $\omega_\perp$ for a randomly chosen value of the condition $\varphi$, $\omega_i$), and the log pdf of the trained model p is evaluated before back-propagation to update the neural-network parameters.

The neural material 126 embeds information specifying a color 318 of the neural material 126 given a view direction 122 and a light direction 130. For instance, the color 318 determines a prominence value 214 that indicates a level of contribution of light to the neural features of the material 120 when viewed from the view direction 122.

FIG. 4 depicts an example 400 of using a mixture of analytical lobes for sampling light directions on neural materials. FIG. 4 is a continuation of the example described in FIG. 3.

In this example, a small MLP 402 receives the input 118, including the neural features of the material 120 and the view direction 122 to infer the parameters of three lobes 404, including one Lambertian lobe and two anisotropic Gaussian lobes, to capture diffuse reflection and highlights in predicted light directions 406, which are trained on reference light directions 408. A Lamertian lobe is a model for diffuse reflection that causes closed polygons to reflect light equally in all directions when rendered. In this example, the small MLP 402 has one hidden layer.

For example, a baseline technique [Fan et al. 2022] approximates the desired pdf $p^*(\omega|\varphi, \omega_i)$ by predicting a combination of a Lambertian lobe and an isotropic 2D Gaussian lobe, given $\varphi$ and $\omega_i$. The predicted parameters are a scalar standard deviation $\sigma$ of the Gaussian lobe and the relative weight w between the two lobes. Because this approach is limited to represent even materials with local shading normal, the baseline is improved by also predicting the mean u of the Gaussian lobe:

$$p(\omega_\perp \mid \varphi, \omega_i) = w\frac{1}{\pi} + (1 - W)G(\omega_\perp; \mu, \sigma)$$

where $G(\omega_\perp; \mu, \sigma)$ is a normalized 2D Gaussian with mean u and standard deviation $\sigma$, evaluated at the projected direction $\omega_\perp$. The inputs to the MLP are the feature vector $\varphi$ and the direction $\omega_i$ in the local shading frame, while the outputs are the mixture parameters: $\mu$, $\sigma$, and w. The Lambertian pdf on the projected hemisphere is a constant $$\frac{1}{\pi},$$

for example, uniform sampling on the projected hemisphere is equivalent to cosine sampling on the hemisphere.

To effectively capture multi-modal highlights or highlights with non-Gaussian or asymmetric falloff, a mixture of one Lambertian lobe and two axis-aligned anisotropic Gaussian lobes is selected with diagonal covariance matrices:

$$P(\omega_\perp \mid \varphi, \omega_i) = w_1\frac{1}{\pi} + w_2 G_d(\omega_\perp; \mu_1, \sigma_1) + w_3 G_d(\omega_\perp; \mu_2, \sigma_2)$$

where $G_d(\omega_\perp; \mu_1, \sigma_1)$ is a 2D Gaussian with mean u and standard deviations $\theta=(\sigma_x, \sigma_y)$ in the x and y axes. The three weights are positive and sum to 1, and are predicted by a simple MLP with one hidden layer, along with the corresponding Gaussian means and standard deviations. Similarly, the inputs to the MLP are a feature vector $\varphi$ and direction $\omega_i$ in the local shading frame, and the outputs are the parameters of the mixture: $\mu_1$, $\sigma_1$, $\mu_2$, $\sigma_2$, $w_1$, $w_2$, $w_3$. Additional components or full anisotropy potentially capture more complex distributions but increase the fitting difficulty and the computational workload for cases with only one highlight, which is resolved by using the two diagonal Gaussian lobes.

FIG. 5 depicts an example 500 of using a normalizing flow for sampling light directions on neural materials. FIG. 5 is a continuation of the example described in FIG. 3.

The normalizing flow 208 is a neural network that receives the input 118 including the neural features of a material 120 $\varphi$ and the view direction 122 $\omega_1$ at a first small MLP 502. Input samples $(\omega_0, \omega_1)$ are transformed to a projected direction $\omega_\perp = (\omega_0, \omega_1)$. The input samples are generated from a Gaussian distribution 504 with MLP-inferred mean and standard deviation. The input samples are then warped by an analytically invertible piecewise rational quadratic (RQ) spline 506. The RQ spline 506 parameters (bin widths, bin heights, derivatives) are inferred by a second small MLP 508. A coupling transform 510 is then performed twice in this example. The normalizing flow 208, for example, generates in predicted light directions 512, which are trained on reference light directions 514.

Neural materials have arbitrary reflection profiles, embedded local normals, texture, and potentially complex layered anisotropic behaviors. A mixture of simple lobes with a few trainable parameters is not expressive enough to provide accurate prominence sampling, when considering the difficulty in determining the number of mixture components for materials. Normalizing flows provide an alternative, as the normalizing flows support both sampling and density evaluation, and have been shown to be able to fit complex, multi-modal distributions.

Normalizing flows 208 learn a bijective mapping between a simple base distribution and an approximation of a complex target distribution. The normalizing flows 208 are used to generate samples from the complex target distribution. An architecture for the normalizing flow 208 with an autoregressive property results in a triangular Jacobian mapping, with an easy-to-compute determinant for pdf evaluation. The normalizing flow 208 architecture also results in tractable invertibility of the mapping [Dinh et al. 2016; Papamakarios et al. 2017], which is useful for prominence sampling of multiple light directions.

A 2D Gaussian is used as a base distribution $p_z$. The normalizing flow 208 learns a bijective function g to map samples z from $p_z$ to samples $y=g(z|\varphi, \omega_i)$ that approximately follow the target $p^*(\cdot|\varphi,\omega_i)$. If the inverse $f=g^{-1}$ and its Jacobian determinant are efficiently computable, the learned distribution p is evaluated at a point (direction) $\omega_\perp$ as:

$$p(\omega_\perp \mid \varphi, \omega_i) = p_z(z) \cdot \left| \frac{\partial z}{\partial \omega_\perp} \right|, \text{ where } z = f(\omega_\perp \mid \varphi, \omega_i).$$

This framework fits pdfs that are evaluated and sampled from efficiently, provided a neural network is identified to represent f (and g) with the desired properties. The coupling transforms 510 are used for simplicity. Namely, each invertible transformation is applied onto one dimension of @ and the two transformations are coupled together to fuse the dimensions.

Regarding the monotonic piecewise rational quadratic (RQ) spline 506, the square region $[-1, 1]$ of the initial z space and target $\omega_\perp$ space are split into several intervals. Within each interval, a monotonically increasing rational-quadratic function is learned:

$$Z = f(\omega_\perp \mid \varphi, \omega_i) = Z_0 + \frac{(z_1 - z_0)[s\xi^2 + \delta_0\xi(1 - \xi)]}{s + [\delta_1 + \delta_0 - 2s]\xi(1 - \xi)},$$

where $\omega$ is one dimension of (x or y) of $\omega_\perp$, $$\xi(z) = \frac{\omega - \omega_0}{\omega_1 - \omega_0}, s = \frac{z_1 - z_0}{\omega_1 - \omega_0},$$

and $\omega_{0(1)}$, $z_{0(1)}$ and $\delta_{0(1)}$ are the locations and derivatives at the boundary of each interval, which are predicted by a 3-layer MLP taking $(\varphi,\omega_i)$ and the other dimension of $\omega_\perp$ as input. 20 intervals are used to capture the pdf variation. Solving and selecting the correct root of a quadratic equation gives the inverse of the transformation. The 3-layer MLP inference and the inverse of the above transformation run twice during sampling because of the two dimensions in the target pdf variable $\omega_\perp$. The predicted splines are shared between the pdf query and sample routine for sampling at each query point $(\varphi,\omega_i)$ in some examples.

The information encoded in the conditional neural feature vector $\varphi$ simplifies the sampling network of invertible transformations to capture the complex spatially varying pdfs. A conditional Gaussian base distribution is used that depends on $(\varphi,\omega_i)$, instead of using a uniform distribution or a Gaussian distribution with fixed zero mean and unit variance. Conditional normalizing flows further reduce the total architecture size (one 3-layer MLPs used in the flow, and one 2-layer MLP to predict the base-Gaussian parameters).

FIG. 6 depicts an example 600 of using a histogram prediction for sampling light directions on neural materials. FIG. 6 is a continuation of the example described in FIG. 3.

The histogram prediction 210 receives the input 118 including the neural features of a material 120 $\varphi$ and the view direction 122 $\omega_1$ at a first MLP 602 to infer a weight, azimuth angle, and latent code for basis histograms. The weight, the azimuth angle, and the latent code are then combined to produce an output histogram. The output histogram is encoded by a second MLP 604 during training, and is then baked into a baked 4D tensor 606 for efficient sampling during inference. The histogram prediction 210 models continuous changes in the pdf lobe shape based on the incoming angle (columns) using a learned rotation 608 and scalar latent code, generating predicted light directions 610, which are trained on reference light directions 612.

The histogram prediction 210 model includes a piecewise constant 2D distribution, i.e., a histogram, represented as a regular grid of bin values. The model predicts a histogram approximating $p^*(\omega|\varphi,\omega_i)$ through the first MLP 602 taking the condition $(\varphi,\omega_i)$ as input. In a variant of the histogram prediction 210 model, instead of directly predicting a histogram for each query, the histograms are decomposed into histogram mixtures, i.e., weighted combinations of shared-basis histograms:

$$p(\omega_\perp \mid \varphi, \omega_i) = \sum_{k=1}^{K} w_k(\varphi, \omega_i) H_k \left( \omega_\perp \mid \omega_k, t_k(\varphi, \omega_i) \right),$$

$$\omega_k = R(\omega_i, \phi_k(\varphi, \omega_i)),$$

where $H_k$ are K basis histograms that are globally shared across the neural material, $w_k$ are the corresponding mixture weights R represents azimuthal rotation, $\phi_k \in [0, 2\pi]$ are rotation angles applied to $\omega_i$, and $t_k \in [0, 1]$ is a scalar latent code. The 2D $(\phi_k, t_k)$ parameterization efficiently encodes continuous changes in the BRDF lobe as the incoming direction $\omega_i$ varies. For example, both the lobe's position and shape change. The code $t_k$ captures the shape change and part of the rotation. This design reduces the number of mixture components needed for fitting the pdf compared to simpler designs.

In the histogram prediction 210 architecture, $w_k$, $\phi_k$, and $t_k$ are encoded into a small MLP that takes the condition ($\varphi$, $\omega_i$) as input, and $H_k$ are implicitly encoded into a ($\omega$, $t_k$)-dependent MLP. After training, basis histograms are based into a K×T×N×N tensor for fast query (K basis histograms with N×N resolution, T latent-code discretization levels).

For training, K=10 basis histograms are used in this example for each neural material, and the network is trained using $L_2$ loss between histogram and ground truth pdf response randomly sampled tuples ($\varphi$, $\omega_i$, $\omega$):

$$l = \sum_{\omega, \varphi, \omega_i} \| p(\omega \mid \varphi, \omega_i) - p * (\omega \mid \varphi, \omega_i) \|_2^2.$$

After training, histograms of resolution N×N=64×64 are tabulated and the latent code t is discretized into T=100 equi-spaced values. To reduce post-training discretization error, a quantization term is added to the loss:

$$l_q = \| t_k - \hat{t}_k \|_2^2,$$

where $\hat{t}_k$ is the quantization of $t_k$.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6.

FIG. 7 depicts a procedure 700 in an example implementation of sampling light directions on neural materials. At block 702 neural features of a material 120 and an indication of a view direction 122 toward the material are received. For example, the view direction 122 aligns with an orientation of a camera.

At block 704, histogram images are generated, using a neural network 204, that depict the neural features of the material 120 viewed from the view direction 122. In some examples, the histogram images are weighted. For example, the histogram images encode distributions of brightness of the material based on the view direction 122. In some examples, the neural network 204 is trained based on a loss between a histogram image and a ground truth probability density function for randomly sampled tuples. Additionally or alternatively, the histogram images represent a piecewise constant two-dimensional distribution. Some examples further comprise generating a histogram mixture that is a weighted combination of the histogram images. Additionally, in some examples, parameters of the neural network 204 include a rotational angle parameter and a quantization level parameter.

At block 706, light directions are sampled on the material from the histogram images.

At block 708, prominence values for each of a plurality of candidate light directions are calculated based on the sampling. The prominence values quantize a contribution of light to the neural features of the material 120 when viewed from the view direction 122.

At block 710, a light direction 130 is determined based on the prominence values, and digital content is edited based on the light direction 130.

FIG. 8 depicts a procedure 800 in an additional example implementation of sampling light directions on neural materials. At block 802, neural features of a material 120 and an indication of a view direction 122 toward the material are received. For example, the view direction 122 aligns with an orientation of a camera.

At block 804, an input distribution is generated using a parametric Gaussian distribution 504 that describes the neural features of the material 120 viewed from the view direction 122. In some examples, the input distribution is warped by an analytically invertible piecewise rational quadratic (RQ) spline 506. Additionally, in some examples, parameters of the RQ spline 506 are inferred by a multilayer perceptron (MLP).

At block 806, a target distribution is generated, using a neural network 204, based on the input distribution and having a different level of complexity than the input distribution. For example, the neural network 204 is a normalizing flow (NF) grouping of generative models. In some examples, the neural network 204 learns a bijective mapping between the input distribution and the target distribution.

At block 808, light directions are sampled on the material from the target distribution.

At block 810, prominence values are calculated for each of a plurality of candidate light directions based on the sampling. For example, the prominence values quantize a contribution of light to the neural features of the material 120 when viewed from the view direction 122.

At block 812, a light direction 130 is determined based on the prominence values.

FIG. 9 depicts a procedure 900 in an additional example implementation of sampling light directions on neural materials. At block 902, neural features of a material 120 and an indication of a view direction 122 toward the material are received.

At block 904, a probability density function (PDF) is generated using a neural network 204 that is a weighted average of the neural features of the material 120 viewed from the view direction 122. For example, the neural network 204 is a multilayer perceptron (MLP). In some examples, the weighted average of the neural features includes a diffuse shape lobe and two isotropic gaussian lobes describing the neural features of the material 120 viewed from the view direction 122. Additionally or alternatively, the neural network 204 is trained to approximate a reference image of the PDF.

At block 906, light directions are sampled on the material from the PDF.

At block 908, prominence values are calculated for each of a plurality of candidate light directions based on the sampling.

At block 910, a light direction 130 is determined based on the prominence values.

Example System and Device

FIG. 10 illustrates an example system generally at 1000 that includes an example computing device 1002 that is representative of one or more computing systems and/or devices that implement the various techniques described herein. This is illustrated through inclusion of the light direction module 116. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices and/or processing systems 1004) to implement techniques, modules, and examples described herein.

The techniques described herein are supported by various configurations of the computing device 1002 and are not limited to the specific examples of the techniques described herein. This functionality is also implementable through use of a distributed system, such as over a "cloud" 1114 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized when computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

What is claimed is:

1. A method comprising:
   receiving, by a processing device, neural features of a material and an indication of a view direction toward the material;
   generating, by the processing device using a neural network, histogram images that depict the neural features of the material viewed from the view direction;
   sampling, by the processing device, light directions on the material from the histogram images;

calculating, by the processing device, prominence values that quantify levels of at least one of light reflection or light color for each of a plurality of candidate light directions based on the sampling;
   identifying, by the processing device, a light direction corresponding to a greater prominence value for light reflection or light color than other light directions of the candidate light directions based on the prominence values; and
   editing, by the processing device, digital content based on the light direction.

2. The method of claim 1, wherein the prominence values quantize a contribution of light to the neural features of the material when viewed from the view direction.

3. The method of claim 1, wherein the histogram images are weighted.

4. The method of claim 1, wherein the histogram images encode distributions of brightness of the material based on the view direction.

5. The method of claim 1, wherein the neural network is trained based on a loss between a histogram image and a ground truth probability density function for randomly sampled tuples.

6. The method of claim 1, wherein the histogram images represent a piecewise constant two-dimensional distribution.

7. The method of claim 1, further comprising generating a histogram mixture that is a weighted combination of the histogram images.

8. The method of claim 1, wherein parameters of the neural network include a rotational angle parameter and a quantization level parameter.

9. The method of claim 1, wherein the view direction aligns with an orientation of a camera.

10. A system comprising:
    a memory component; and
    a processing device coupled to the memory component, the processing device to perform operations comprising:
       receiving neural features of a material and an indication of a view direction toward the material;
       generating, using a parametric Gaussian distribution, an input distribution that describes the neural features of the material viewed from the view direction;
       generating, using a neural network, a target distribution based on the input distribution and having a different level of complexity than the input distribution;
       sampling light directions on the material from the target distribution;
       calculating prominence values that quantify levels of at least one of light reflection or light color for each of a plurality of candidate light directions based on the sampling; and
       identifying a light direction corresponding to a greater prominence value for light reflection or light color than other light directions of the candidate light directions based on the prominence values.

11. The system of claim 10, wherein the prominence values quantize a contribution of light to the neural features of the material when viewed from the view direction.

12. The system of claim 10, wherein the neural network is a normalizing flow (NF) grouping of generative models.

13. The system of claim 10, wherein the input distribution is warped by an analytically invertible piecewise rational quadratic (RQ) spline.

14. The system of claim 13, wherein parameters of the RQ spline are inferred by a multilayer perceptron (MLP).

15. The system of claim 10, wherein the neural network learns a bijective mapping between the input distribution and the target distribution.

16. The system of claim 10, wherein the view direction aligns with an orientation of a camera.

17. A non-transitory computer-readable storage medium storing executable instructions, which when executed by a processing device, cause the processing device to perform operations comprising:

receiving neural features of a material and an indication of a view direction toward the material;

generating, using a neural network, a probability density function (PDF) that is a weighted average of the neural features of the material viewed from the view direction;

sampling light directions on the material from the PDF;

calculating prominence values that quantify levels of at least one of light reflection or light color for each of a plurality of candidate light directions based on the sampling; and identifying a light direction corresponding to a greater prominence value for light reflection or light color than other light directions of the candidate light directions based on the prominence values.

18. The non-transitory computer-readable storage medium of claim 17, wherein the neural network is a multilayer perceptron (MLP).

19. The non-transitory computer-readable storage medium of claim 17, wherein the weighted average of the neural features includes a diffuse shape lobe and two isotropic gaussian lobes describing the neural features of the material viewed from the view direction.

20. The non-transitory computer-readable storage medium of claim 17, wherein the neural network is trained to approximate a reference image of the PDF.

* * * * *